(12) United States Patent
Huang et al.

(10) Patent No.: US 11,333,487 B2
(45) Date of Patent: May 17, 2022

(54) COMMON PATH MODE FIBER TIP DIFFRACTION INTERFEROMETER FOR WAVEFRONT MEASUREMENT

(71) Applicant: KLA CORPORATION, Milpitas, CA (US)

(72) Inventors: Haifeng Huang, Livermore, CA (US);
Rui-Fang Shi, Cupertino, CA (US);
Dan Wack, Fredericksburg, VA (US);
Robert Kestner, Pleasant Hill, CA (US)

(73) Assignee: KLA CORPORATION, Milpitas, CA (US)

( * ) Notice: Subject to any disclaimer, the term of this patent is extended or adjusted under 35 U.S.C. 154(b) by 0 days.

(21) Appl. No.: 16/818,050

(22) Filed: Mar. 13, 2020

(65) Prior Publication Data

US 2021/0123716 A1    Apr. 29, 2021

Related U.S. Application Data

(60) Provisional application No. 62/927,118, filed on Oct. 28, 2019.

(51) Int. Cl.
*G01B 9/02*     (2006.01)
*G01M 11/02*    (2006.01)
(Continued)

(52) U.S. Cl.
CPC ..... *G01B 9/02074* (2013.01); *G01B 9/02007* (2013.01); *G01B 11/255* (2013.01);
(Continued)

(58) Field of Classification Search
CPC ............ G01B 9/02057; G01B 9/02074; G01B 11/255; G01B 2290/70; G01M 11/0271
See application file for complete search history.

(56) References Cited

U.S. PATENT DOCUMENTS

| 5,485,275 A | * | 1/1996 | Ohtsuka ............... G01B 11/255 356/513 |
| 5,548,403 A | | 8/1996 | Sommargren |

(Continued)

FOREIGN PATENT DOCUMENTS

| EP | 2950065 A1 | 12/2015 |
| JP | 2015060229 A | 3/2015 |

(Continued)

OTHER PUBLICATIONS

WIPO, ISR for International Application No. PCT/US2020/057438, Feb. 24, 2021.

(Continued)

*Primary Examiner* — Michael A Lyons
(74) *Attorney, Agent, or Firm* — Hodgson Russ LLP

(57) ABSTRACT

Reference and test waves are directed in a common path mode in a fiber tip diffraction interferometer. A first fiber can be used to generate the reference wave and a second fiber can be used to generate the test wave. Each fiber can include a single mode fiber tip that defines a wedge at an end without a coating on end surface or a tapered fiber tip. The fiber tip diffraction interferometer can include an aplanatic pupil imaging lens or system disposed to receive both the test wave and the reference wave and a sensor configured to receive both the test wave and the reference wave.

17 Claims, 16 Drawing Sheets

(51) Int. Cl.
    *G01B 11/255*     (2006.01)
    *G01B 9/02055*     (2022.01)
    *G01B 9/02001*     (2022.01)

(52) U.S. Cl.
    CPC ..... G01M 11/0271 (2013.01); *G01B 2290/60* (2013.01); *G01B 2290/70* (2013.01)

(56) References Cited

U.S. PATENT DOCUMENTS

| | | |
|---|---|---|
| 5,933,236 A | 8/1999 | Sommargren |
| 6,704,112 B1 | 3/2004 | Sommargren et al. |
| 6,876,456 B2 | 4/2005 | Sommargren |
| 6,909,510 B2 | 6/2005 | Sommargren et al. |
| 2002/0176092 A1 | 11/2002 | Deck |
| 2006/0033925 A1 | 2/2006 | Drabarek et al. |

FOREIGN PATENT DOCUMENTS

| | | |
|---|---|---|
| KR | 20030061643 A | 7/2003 |
| WO | 1999064817 A1 | 12/1999 |
| WO | 2003098194 A1 | 11/2003 |

OTHER PUBLICATIONS

Kihm et al., "Oblique fiber optic diffraction interferometer for testing spherical mirrors," Optical Engineering, Dec. 2005, vol. 44, No. 12, pp. 125601-1-4.

Chkhalo et al., "Chapter 6: Manufacturing and Investigating Objective Lens for Ultrahigh Resolution Lithography Facilities," Lithography, Feb. 2010, pp. 71-114.

Brunner et al., "Advanced Optical Components, "Handbook of Lasers and Optics, 2007, p. 475, Chapter 8.8, Springer.

Goodman, Introduction to Fourier Optics, 3rd Edition, 2004, p. 52, Roberts and Co. Publishers.

Oshikane et al., "Phase-Shifting Point Diffraction Interferometer Having Two Point Light Sources of Single-Mode Optical Fibers," 2012, Selected Topics on Optical Fiber Technology, 355-422.

Chkhalo et al., "A Source of a Reference Spherical Wave Based on Single Mode Optical Fiber with a Narrowed Exit Aperture," 2008, Rev Sci. Instrum., 1-5, vol. 79, 033107.

Rhee & Kim, "Absolute Distance Measurement by Two-Point-Diffraction Interferometry," 2002, Applied Optics, 5921-5928, vol. 41, No. 28.

Johnson et al., "Construction and Testing of Wavefront Reference Sources for Interferometry of Ultra-Precise Imaging Systems," 2005, Proc. of SPIE, 1-10, 58690P.

Sommargren et al., "100-Picometer Interferometry for EUVL," 2002, Proc. of SPIE, 316-328, vol. 4688.

Krieg, "Absolute Heterodyne Interferometer for Strongly Aspherical Mirrors," 2004, Delft Univ. of Technology.

Klaver, "Novel Interferometer to Measure the Figure of Strongly Aspherical Mirrors," 2001, Delft Univ. of Technology.

Kihm & Kim, "Nonparaxial Free-Space Diffraction from Oblique End Faces of Single-Mode Optical Fibers," 2004, Optics Letters, 2366-2368, vol. 29, No. 20.

* cited by examiner

COMMON PATH MODE FIBER TIP DIFFRACTION INTERFEROMETER FOR WAVEFRONT MEASUREMENT

CROSS-REFERENCE TO RELATED APPLICATIONS

This application claims priority to the provisional patent application filed Oct. 28, 2019 and assigned U.S. App. No. 62/927,118, the disclosure of which is hereby incorporated by reference.

FIELD OF THE DISCLOSURE

This disclosure relates to optical single mode fiber (SMF) tip wave diffraction and interferometers.

BACKGROUND OF THE DISCLOSURE

Optical interferometers are widely used in measuring the surface shape of an optical element or the wavefront aberration of an imaging system, either refractive or reflective. In measurements, a spherical reference wave with known wavefront is needed. The spherical reference wave can be calibrated. In a Fizeau interferometer, the reference wave is generated by the reflection from a special surface of a transmission sphere. The surface is called reference surface, which is spherical and concentric with the generated spherical reference wave. The test wave, which carries the wavefront aberration information of the measured optics or imaging system, interferes with the reference wave on a 2D sensor, generating interference patterns called interferograms. Analyzing the interferograms gives the accurate information of surface shape of measured optics or the wavefront aberration of measured imaging system. Continuous progresses of semiconductor technology present a challenge for interferometry, namely that projection or imaging optical systems in EUV lithography or EUV mask inspection require interferometric wavefront metrology methods having an accuracy better than 0.1 nm root mean square (RMS). In order to reach wavefront measurement accuracy of sub-nm RMS level, the reference wavefront must be calibrated to sub-nm RMS level, and the systematic errors from the optical elements and sensor of the interferometers have to be removed as much as possible. One of the ideas of removing systematic errors is common path mode, in which the test and reference waves travel the same path in an interferometer and hence the systematic errors in both waves cancel out during the interference process on a 2D sensor.

Calibrating a reference wave, e.g. in a Fizeau interferometer, is a complex and time-consuming process. On the other hand, an ideal reference wave, i.e. a perfect spherical wavefront, requires no such complex calibration process. A near-perfect spherical reference wave can be generated for interferometry by using the far field diffraction wave of a single mode optical fiber tip. Depending on different designs, the SMF tip can be wedged and super-polished, either coated or uncoated. It can be also tapered, wedged and metal film side-coated.

Some previous designs use SMF tips that are coated with thin metal films to increase the reflectivity of the SMF tip surface. Metal film coating roughness or any curvature of film coating will deteriorate the ideal sphericity of the transmitted far field diffraction reference wave from an SMF tip. Even with a perfect coating quality, multiple reflections from the two surfaces of the metal film coating will distort the diffraction wavefront. Even for a perfectly-uniform metal film coating, the diffraction light rays of different travel angles originated from the tip will experience different path lengths and, thus, different phase shifts from a perfectly-uniform metal film coating, which distorts the spherical diffraction wavefront. Furthermore, a metal film coating on the fiber tip absorbs more light power than an uncoated silica fiber tip in a broad wavelength range, which will cause thermal effects in alignment if the light power density is large enough. Therefore, using a metal film coated SMF fiber tip causes unnecessary problems to the sphericity of the diffraction wave from the fiber tip.

Some previous designs use two different SMF tips to produce a test wave and reference wave respectively. The tip surfaces are super-polished and uncoated. However, when both waves are combined together to generate interferograms, an extra beam combiner, e.g. cubic or plate beam splitter, is used, in which the test and reference wave do not travel the same path in the interferometer, hence not in common path mode. Therefore, the systematic errors in both waves caused by the extra beam combiner do not cancel out, leading to systematic errors in wavefront measurement.

Some previous designs use two different SMF tips to produce a test and reference waves respectively. In wavefront measurement process, however, a shearing ranging from tens to a few hundred microns between both waves is introduced. Therefore, the two waves do not travel the same path in interferometer and systematic errors in them do not cancel out.

Therefore, improved fiber tip designs and methods of use are needed.

BRIEF SUMMARY OF THE DISCLOSURE

A fiber tip diffraction interferometer is disclosed in a first embodiment. The fiber tip diffraction interferometer comprises a first fiber that generates a reference wave and a second fiber or a pinhole that generates a test wave. The test wave is focused to a point where the test wave is reflected. The test wave and the reference wave are in a common path mode after the test wave is reflected. An aplanatic imaging lens or a pupil imaging system is disposed to receive both the test wave and the reference wave. A sensor is configured to receive both the test wave and the reference wave. The sensor is disposed on an opposite side of the aplanatic imaging lens or a pupil imaging system from the first fiber.

The first fiber and/or the second fiber can includes a single mode fiber tip that defines a wedge at an end. A flat surface of the wedge is not perpendicular to an axis of the fiber. The flat surface of the wedge does not have a coating thereon. The flat surface can be disposed at an angle from 14 degrees and 25 degrees relative to the axis of the fiber. The fiber can have a diameter of 125 The surface roughness of the flat surface can be from 0 nm RMS to 0.8 nm RMS, such as 0.4 nm RMS or less. The fiber can define an outer circumferential surface such that at least part of the outer circumferential surface does not have a coating thereon.

In an instance, the fiber defines a first diameter at a point adjacent where the wedge is disposed and a second diameter at a non-zero point away from the first diameter. The first diameter and the second diameter are the same.

In another instance, the fiber defines a first diameter at a point adjacent where the wedge is disposed and a second diameter at a non-zero point away from the first diameter. The first diameter is larger than the second diameter. For example, the first diameter is at least 1 mm and the second diameter is 125 μm.

The first fiber and/or the second fiber can be silica. A core of the first fiber and/or the second fiber can be doped.

The fiber tip diffraction interferometer can further include an imaging system. The test wave can pass from the second fiber through the imaging system.

The first fiber and/or the second fiber can have a tapered fiber tip with a side metal coating.

The fiber tip diffraction interferometer can further include a calibrated optics in a path of the test wave configured to calibrate a sphericity of the test wave and the reference wave.

The test wave can be reflected off an end surface of the first fiber.

The fiber tip diffraction interferometer can further include a thin film. The test wave is reflected off the thin film and the reference wave is directed through the thin film. One surface of the thin film includes an antireflective coating. In an instance, the first fiber tip and the second fiber tip are conjugate with each other to a reflective surface of the thin film.

The fiber tip diffraction interferometer can further include a laser in optical communication with the first fiber and the second fiber.

The fiber tip diffraction interferometer can also include a splitter in optical communication with the laser; a first polarization control unit along the first laser path; a second polarization control unit along the second laser path; a power control unit along the second laser path; a time delay control unit along the second laser path; and a phase-shift control unit along the second laser path. The splitter forms a first laser path to the second fiber or the pinhole and a second laser path to the first fiber.

A method is provided in a second embodiment. The method comprises generating a reference wave with a first fiber. A test wave is generated with a second fiber or a pinhole. The test wave is reflected from a point to be in a direction of the reference wave. The test wave and the reference wave are in a common path mode after the reflecting. The reference wave and the test wave are directed at a 2D sensor after the reflecting.

The first fiber can include a single mode fiber tip that defines a wedge at an end. A flat surface of the wedge is not perpendicular to an axis of the fiber. The flat surface of the wedge does not have a coating thereon. The test wave is directed at the flat surface of the first fiber and the point for reflecting the test wave is on the flat surface.

The method can further include directing the test wave and the reference wave through an aplanatic imaging lens or system.

The test wave can be directed at a thin film and the reference wave can be directed through the thin film. The point for reflecting the test wave can be on the thin film. One surface of the thin film includes an antireflective coating. In an instance, a diffraction wavefront of the test wave can be calibrated.

The first fiber and/or the second fiber can have a tapered fiber tip with a side metal coating.

The method can further include calibrating a diffraction wavefront of the test wave using a calibrated optics.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
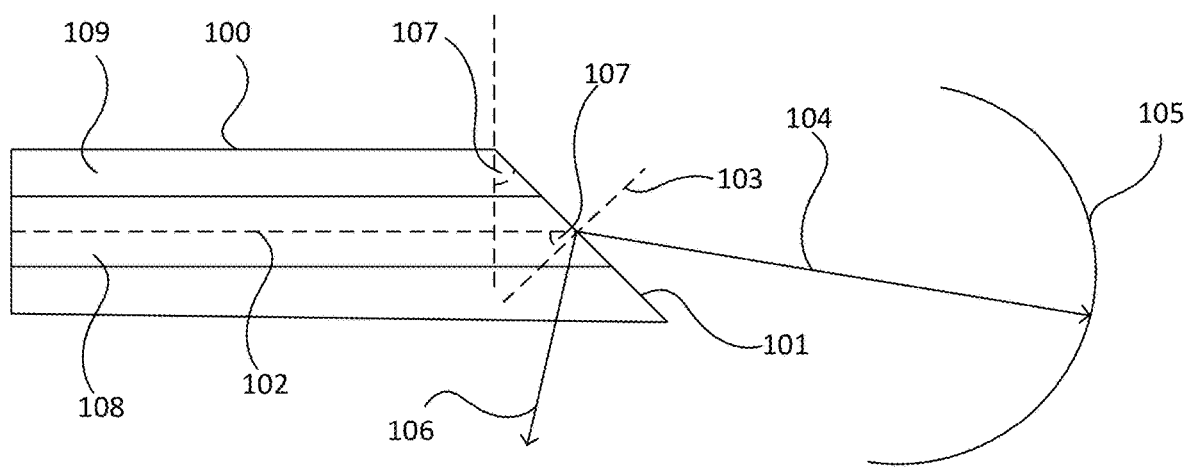
FIG. 1 is a schematic of a wedged, super-polished, and uncoated single mode fiber (SMF) tip.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

In this disclosure, a wedged, end surface super-polished, and uncoated SMF tip is used to generate a near-perfect spherical reference wave. Here the phrase "near-perfect" means the generated diffraction wave, after removing piston, tilt, and defocus, only slightly deviates from an ideal spherical wave compared with the wavefront measurement accuracy target, e.g. 10 pm RMS wavefront spherical deviation is much smaller than 0.1 nm RMS accuracy target. Another similar SMF tip or a pinhole is used to generate a near-perfect test wave by diffraction, which first passes through measured optics (e.g., a single lens) or a refractive or reflective imaging system. The test wave carries the aberration information of measured optics or imaging system. Then the measured optics or imaging system focuses the test wave onto the end surface of the reference SMF tip, which reflects the test wave to the direction of reference wave propagation. After the reflection, both waves travel along the same path in interferometer, i.e. they travel in common path mode. Systematic errors in both waves cancel out. In this common path mode fiber tip diffraction interferometer (FTDI), the end surface of the reference SMF tip is used as the beam combiner and no extra beam combiner is needed. No shearing between the two waves is introduced in the reflection. The design fully utilizes the ideal sphericity of SMF diffraction wavefronts and the advantage of common path mode interferometer. The lateral size of the reference SMF tip surface can be made to the order of mm or larger to improve the spatial resolution of measured wavefront.

In another design of common path mode FTDI, an end surface super-polished and uncoated SMF tip, or a tapered and metal film side-coated SMF tip is used to generate a spherical reference wave. The tip can be wedged or not wedged. The reference wave transmits through a tilted thin film which has high surface roughness and flatness quality. Similar to the first design, the test wave carrying the aberration information to be measured is reflected by the front surface (viewed from the test wave) of the thin film to the direction of the reference wave propagation. After the reflection, both waves travel in common path mode. The back surface of the thin film is antireflective (AR) coated to remove reflections from it as much as possible. The thin film is used as a beam combiner of both waves. To reduce the systematic errors by the thin film, its thickness is controlled to a few hundred nm or micron level. The wavefront error of the reference wave caused by its transmission through the thin film can be accurately modeled by optical design software such as Zemax. The focal point of the test wave is not on the reflective surface of the thin film. In fact, it is the mirror image of the reference tip by the reflective film surface. The thin film lateral size is on the order of mm level or larger to reach high spatial resolution of measured wavefront. Compared with the first design of common path mode FTDI, this one has the full flexibility of the reference wave SMF tip design.

By using the two proposed common path mode FTDI designs, the sphericity of SMF tip diffraction wavefronts can be calibrated accurately by using a transmissive lens with known aberration, i.e. its aberration has been calibrated accurately by other methods or by using a high-quality thin film as beam combiner.

FIG. 1 is a schematic of a wedged, end surface super-polished, and uncoated SMF tip. A fiber 100 includes a single mode fiber tip that defines a wedge at an end. A flat surface 101 of the wedge is not perpendicular to an axis 102 of the fiber 100. The flat surface 101 of the wedge does not have a coating thereon. Thus, the material of the fiber 100 is exposed to and in contact with the environment (e.g., air, vacuum, etc.). The flat surface 101 is super-polished to a flat surface. The surface roughness after super-polishing is typically better than 0.4 nm RMS. The flatness of the surface is as high as possible, and low spatial frequency figure errors of the surface are avoided as much as possible. With a professional super-polish process, a surface flatness of sub-nm peak-to-valley (PV) level can be reached.

The flat surface 101 is at an angle 107 relative to the axis 102 of the fiber. The axis 102 extends along a center of the fiber 100. 103 is the normal direction of surface 101 and 104 is the refractive direction by Fresnel's law. The angle 107 is picked to generate large enough refractive angle of 104 to fully separate the test wave and the reference wave light cones (see FIGS. 9, 13, and 16). The angle 107 of 14 degree and 25 degree has been used in wavefront simulation (see FIGS. 2, 3, 4, 5, 6A, and 6B).

In an instance, the fiber 100 is made of silica. The fiber 100 includes a fiber core 108 near a center of the fiber 100 along the axis 102 and a cladding 109 around the fiber core 108. The fiber core 108, by doping, has higher refractive index than the cladding 109. Depending on the light wavelength used, for a SMF, both the refractive index difference between the fiber core 108 and cladding 109 and the diameter of the fiber core 108 will be different. The fiber 100 produces a far field diffraction wavefront 105. The mode field in SMF 100 (not shown in FIG. 1) also generates a reflected light 106 by the surface 101.

A step-index SMF model is used in diffraction wavefront simulations. Scalar field Huygens-Fresnel diffraction theory is numerically integrated to calculate the far field diffraction wavefront. The model includes the non-paraxial effect. The LP01 mode field in the fiber is analytically calculated first. At the tip flat surface, the aperture field (i.e., the transmitted field out of the tip surface) is calculated to be the Fresnel transmission of the LP01 mode field, including the effect of small refractive index difference between the fiber core and cladding. In this calculation, the boundary conditions at the core-cladding interface and at the fiber end surface are satisfied, only ignoring the infinitely thin ring which is the intersection between the core-cladding interface and the tip end flat surface. The calculated aperture field is numerically propagated to the far-field diffraction wavefront by the Huygens-Fresnel principle. In the simulation, the calculation grid size on the end surface is a few nm. The integration area is large enough compared with the LP01 mode field diameter (MFD), which is approximately a few µm, to ensure the numerical error was negligible. Typical SMF cladding diameter is 125 µm, though other diameters are possible.

This diffraction wave sphericity simulation is performed for both example wavelengths 355 nm and 633 nm, and for wedge angle of 14 degrees and 25 degrees. The wedge angle is defined to be the angle between the SMF axis (e.g. axis 102 in FIG. 1) and the normal direction of the end flat surface. Besides the transmitted wave, there exists the reflected wave from the end surface inside the fiber, as shown by the reflected light 106 in FIG. 1, which transmits through the cladding of the fiber 100 and will not interfere with wavefront measurement. When a SMF is cleaved, the core region can have a dip with depth of several nm if there is no end surface polishing. This dip impacts the diffraction wave sphericity. Surface polishing of the tip end is needed, and quality of the polishing can affect the ideal sphericity. In the simulation, a residual dip depth of 0.1 nm is included. A surface roughness of 0.4 nm RMS is used. FIGS. 2-5 show examples of the Zernike spectra of the spherical wavefront error of SMF tip diffraction waves corresponding to the two wavelengths and the two wedge angles. The SMF tip parameters are included in the following captions of FIGS. 2-5. In FIGS. 2-5, the sphericity of diffraction waves of numerical aperture (NA) equal to 0.3 is quantified as the root sum square (RSS) value, in units of milliwave (1/1000 of a wave, mWave) of the Zernike terms from Z5 to Z36. The piston, tilt, and defocus errors in the wavefront are not included in the RSS values. After converting the RSS mWave to nm RMS, all four sphericity examples give single digit pm RMS wavefront error when compared with an ideal spherical wave. Even with 0.3 nm deep dip at fiber core region, the simulation of 633 nm and 25 degree case gives only 18 pm RMS wavefront error from Z5 to Z36. Fiber core dip mainly influence defocus Z4. The simulation shows the ideal aperture field on the tip flat surface for the highest quality sphericity of diffraction waves is a plane wave. The tip end polishing process shall remove low spatial frequency surface structures on the surface as much as possible. The simulation also shows the sphericity is not so sensitive to the surface roughness (e.g. less than 0.8 nm RMS).

Figure 2:
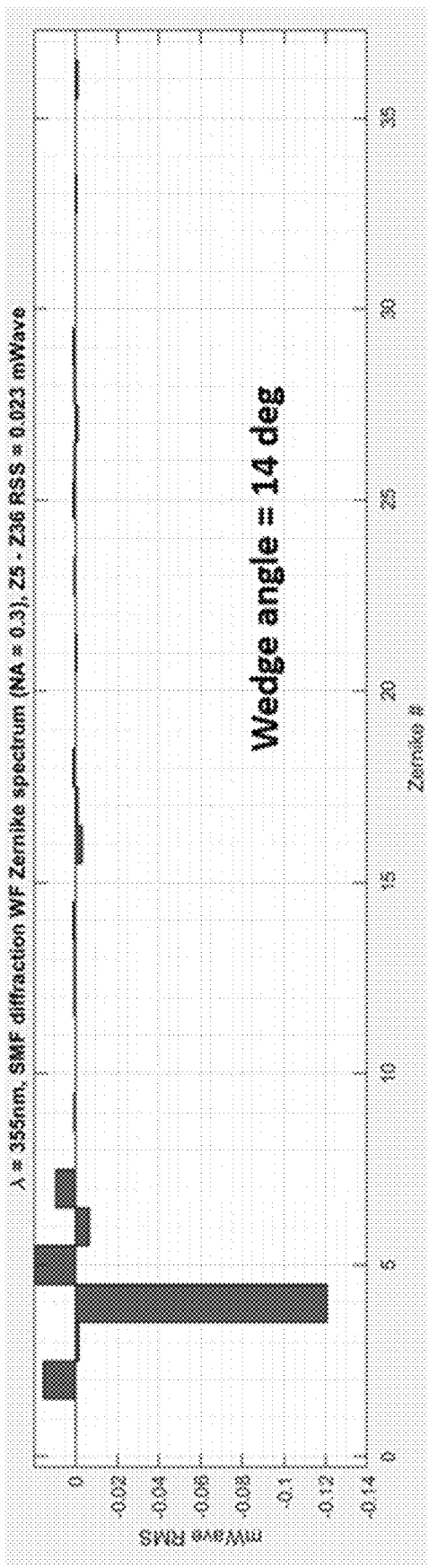
FIG. 2 is a first example of Zernike spectrum of the spherical wavefront error of simulated SMF tip far-field diffraction wave.

FIG. 2 is an example of Zernike spectrum of the spherical wavefront error of simulated SMF tip far-field diffraction wave. In the example, the wavelength is 355 nm, the fiber core radius is 571 nm, the relative core-cladding refractive index difference is 0.008, the wavefront spherical radius is 5 cm, the end surface roughness is 0.4 nm RMS, and the surface flatness core dip depth is 0.1 nm. The tip surface tilt angle is 14 degree. In FIG. 2, Z5-Z36 root sum of squares (RSS)=0.023 mWave=8 pm RMS.

Figure 3:
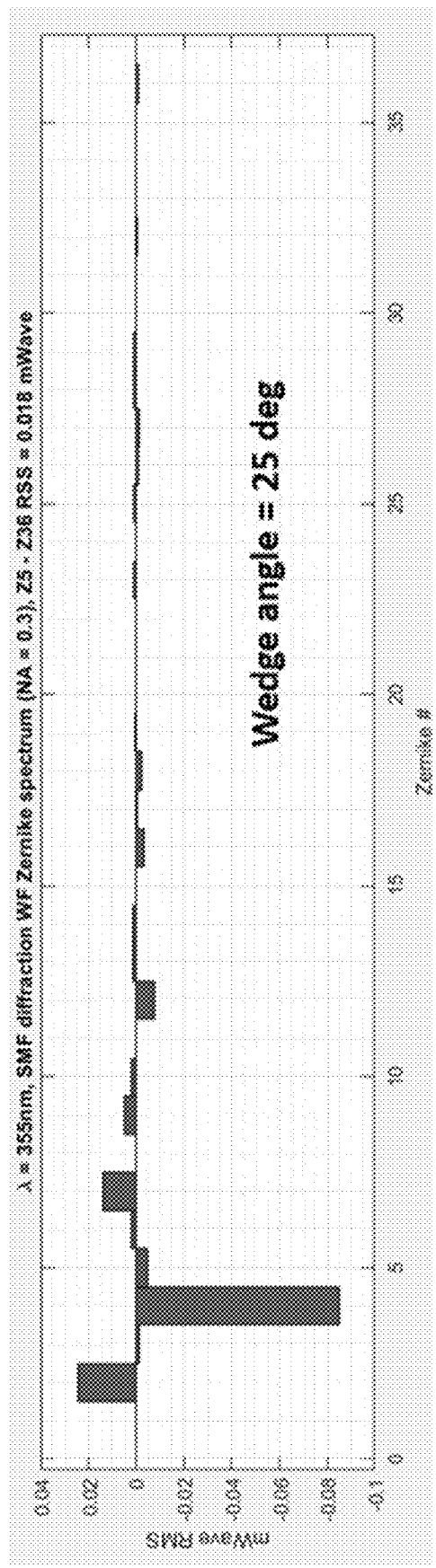
FIG. 3 is a second example of Zernike spectrum of the spherical wavefront error of simulated SMF tip far-field diffraction wave.

FIG. 3 is another example of Zernike spectrum of the spherical wavefront error of simulated SMF tip far-field diffraction wave. In the example, the wavelength is 355 nm, the fiber core radius is 571 nm, the relative core-cladding refractive index difference is 0.008, the wavefront spherical radius is 5 cm, the end surface roughness is 0.4 nm RMS, and the surface flatness core dip depth is 0.1 nm. The tip surface tilt angle is 25 degree. In FIG. 3, Z5-Z36 RSS=0.018 mWave=6 pm RMS.

Figure 4:
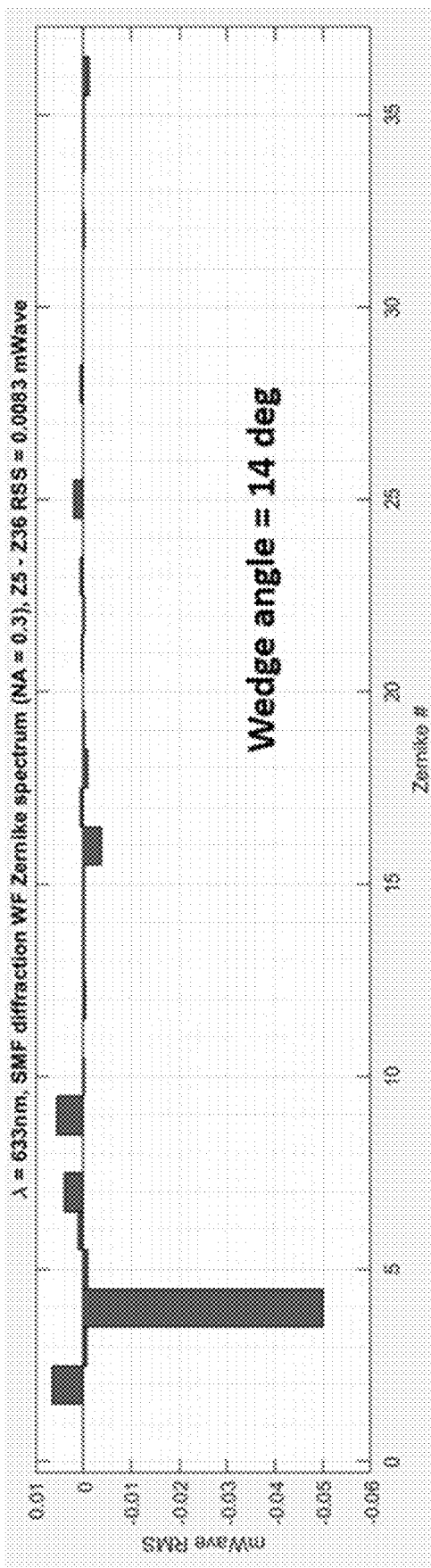
FIG. 4 is a third example of Zernike spectrum of the spherical wavefront error of simulated SMF tip far-field diffraction wave.

FIG. 4 is another example of Zernike spectrum of the spherical wavefront error of simulated SMF tip far-field diffraction wave. In the example, the wavelength is 633 nm, the fiber core radius is 931 nm, the relative core-cladding refractive index difference is 0.01, the wavefront spherical radius is 5 cm, the end surface roughness is 0.4 nm RMS, and the surface flatness core dip depth is 0.1 nm. The tip surface tilt angle is 14 degree. In FIG. 4, Z5-Z36 RSS=0.0083 mWave=5 pm RMS.

Figure 5:
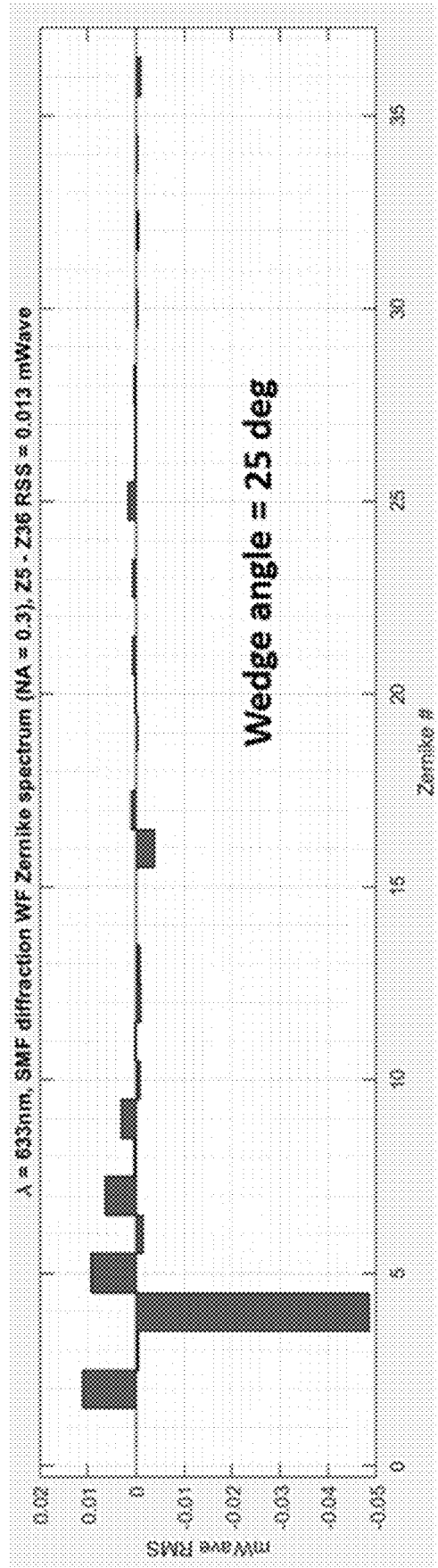
FIG. 5 is a fourth example of Zernike spectrum of the spherical wavefront error of simulated SMF tip far-field diffraction wave.

FIG. 5 is another example of Zernike spectrum of the spherical wavefront error of simulated SMF tip far-field diffraction wave. In the example, the wavelength is 633 nm, the fiber core radius is 931 nm, the relative core-cladding refractive index difference is 0.01, the wavefront spherical radius is 5 cm, the end surface roughness is 0.4 nm RMS, and the surface flatness core dip depth is 0.1 nm. The tip surface tilt angle is 25 degree. In FIG. 5, Z5-Z36 RSS=0.013 mWave=8 pm RMS.

Figures 6A, 6B:
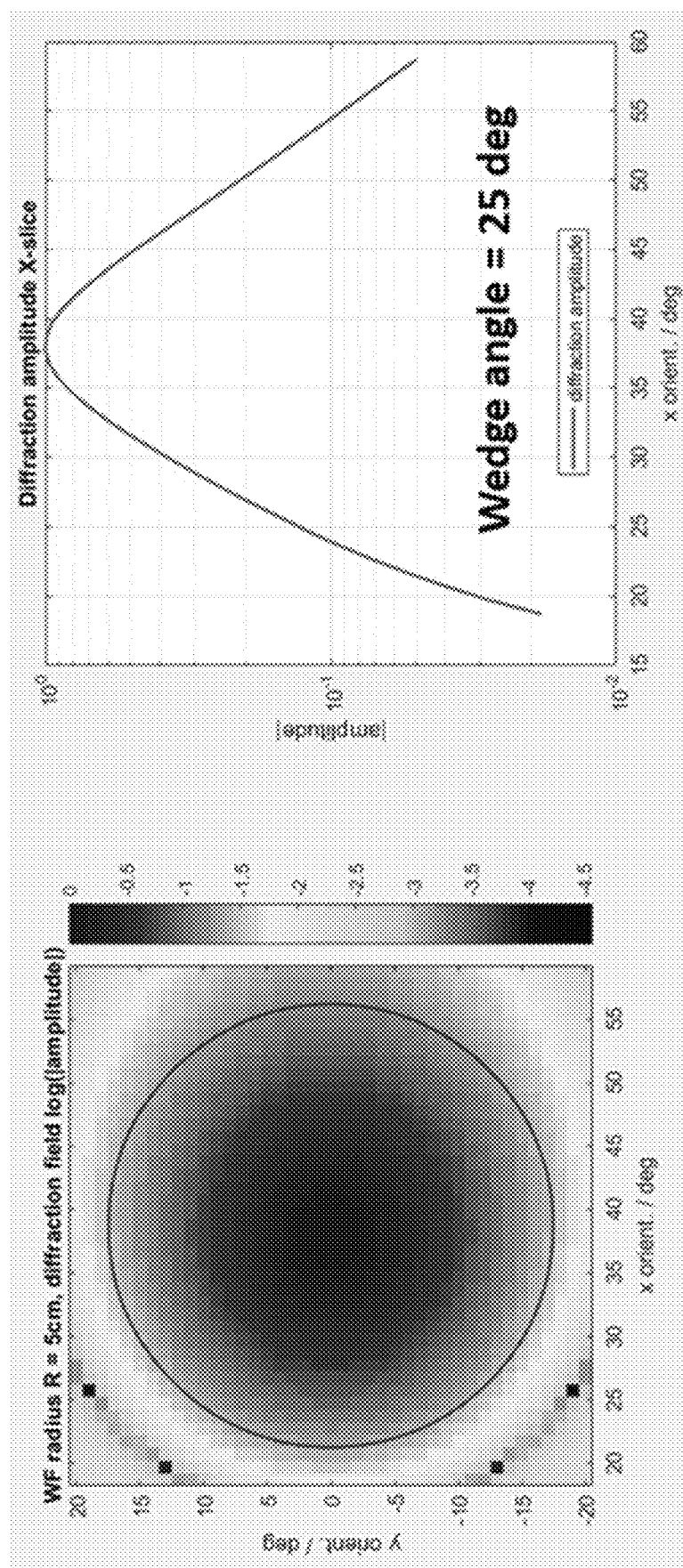
FIG. 6A is an example of simulated diffraction field and FIG. 6B is an example of simulated amplitude shape of SMF tip far field diffraction wave.

FIG. 6A is a 2D plot of simulated diffraction field and FIG. 6B is a 1D slice of the simulated field of SMF tip far field diffraction wave. In the example of FIGS. 6A and 6B, the wavelength is 355 nm, the fiber core radius is 571 nm, the relative core-cladding refractive index difference is 0.008, the wavefront spherical radius is 5 cm, the end surface roughness is 0.4 nm RMS, and the surface flatness core dip depth is 0.1 nm. The tip surface tilt angle is 25 degree.

FIGS. 6A and 6B provide a typical example of the amplitude shape of the diffraction wave for 355 nm and 25 degrees wedge angle. The amplitude shape is near-Gaussian. The peak amplitude direction corresponds to the angle predicted by Snell's refraction law. The zero degree angle in the FIGS. 6A and 6B is defined to be the normal direction of the tip end flat surface (103 in FIG. 1). The circle in the FIG. 6A corresponds to the light cone size of NA of 0.3. At this circle, although the wavefront error is low, the amplitude drops to a few percent of the peak. For NA of 0.2, the amplitude drops to approximately 10% of the peak and the wavefront error is even lower. To measure larger NA optics and to achieve more uniform reference wave amplitude, for the same wavelength, one can use tapered fiber tip or metal film side-coated, tapered fiber tip with a sub-micron aperture. Another option is to design a SMF with smaller LP01 MFD by increasing the core-cladding refractive index difference. The ratio between the wavelength and MFD determines the usable measurement NA of a diffraction wave.

Figure 7:
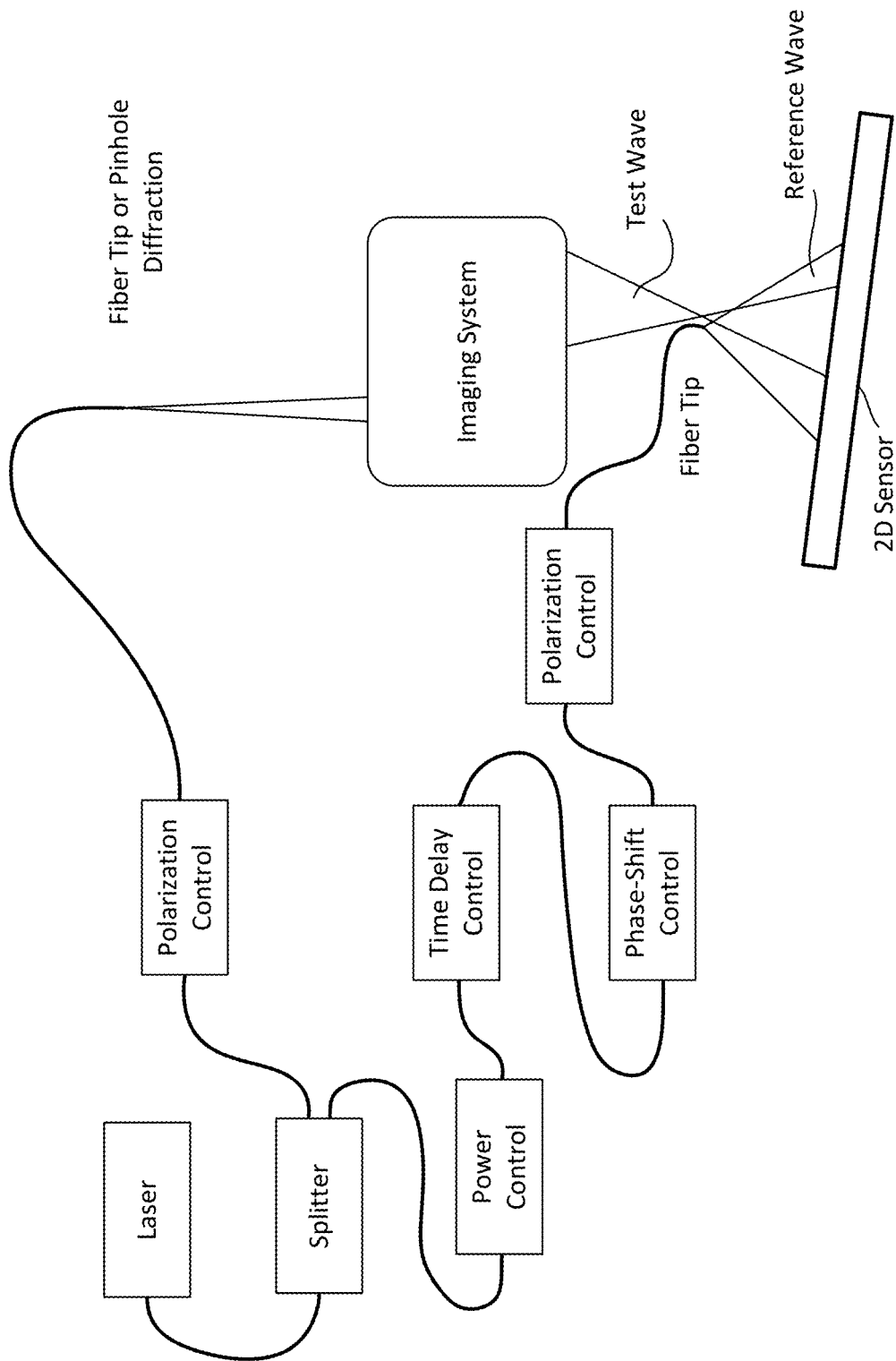
FIG. 7 is a diagram of an embodiment of a non-common path mode fiber tip diffraction interferometer.

FIG. 7 is a diagram of an embodiment of a non-common path mode FTDI. In FIG. 7, curved lines stand for SMF. The low NA side is the image side and the opposite the field side. The imaging system focuses a spherical wave originated from an image point to a point of the field side. The fiber tips in FIG. 7 can be embodiments disclosed herein. Details of this embodiment are explained in following paragraphs.

The FTDI in FIG. 7 is in non-common path mode with the non-zero shearing between the reference fiber tip and test wave focal point, though some or all components in FIG. 7 can be used with a common path mode embodiment. Using two wave sources can fully use the NA of both waves. The imaging system can be reflective or transmissive or can be just a single positive transmissive lens. The spherical probe wave can be generated either by SMF tip diffraction or pinhole diffraction from the image side after polarization control. This tip can be wedged to reflect the unnecessary light feedback off the imaging system. On the reference fiber tip side, the laser passes, in sequence, the power control unit, time delay control unit, phase shift control unit, and polarization control unit before it generates the spherical reference wave through diffraction. The system of FIG. 7 can use a wavelength from 355 nm to near-infrared. In an example, the wavelength is 633 nm. The power control unit can provide optimum contrast of interferograms. If the laser has broad bandwidth and, hence, short coherence length, the time delay control unit matches the optical path lengths of both arms accurately. The phase-shift control unit provides accurate phase-shift steps in the measurement of the test wavefront error. This accurate phase-shift can be realized either in free space before laser-SMF coupling or by a SMF coil. In the reference arm, polarization control unit matches the polarization state between both waves for the optimum interferogram contrast.

With recorded 2D interferograms of accurate phase steps, a 2D optical phase difference (OPD) map can be measured by using algorithms of phase-shift interferometers. Assuming an ideal spherical reference wavefront, if the XYZ positions of both the reference tip and each pixel of the sensor (including sensor shift, tilt, pixel XY error, and surface warping errors) are known, then the test wavefront on the sensor surface can be accurately calculated. Since the sensor surface is not conjugate with the exit pupil of the measured imaging system, the measured test wavefront (both phase and amplitude) needs to be accurately propagated from the sensor surface to the exit pupil (not shown in FIG. 7).

Figure 8:
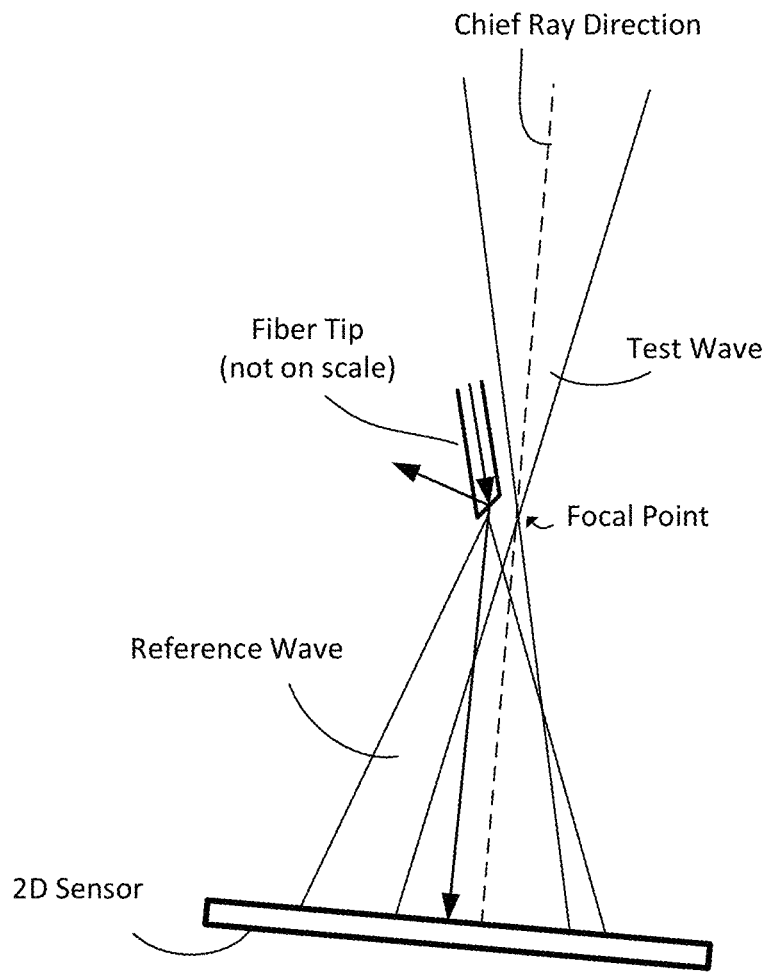
FIG. 8 is a diagram illustrating an embodiment of a wedged fiber tip used in non-common path mode fiber tip diffraction interferometer.

FIG. 8 is diagram illustrating an embodiment of a wedged fiber tip used in non-common path mode fiber tip diffraction interferometer. The long thick arrow points in the reference wave to the refraction direction, parallel with the chief ray direction of test wave. The thin arrow pointed away from the fiber tip represents the reflected light from the tip surface in the fiber.

If the test wave NA on the field side is 0.2, then a wedge angle of 25 degrees is needed, with which the angle between the fiber axis and the light refraction direction by Snell's law is small enough that the fiber tip will not obscure the test wave light cone. The reference wave refraction direction is aligned to be parallel with the chief ray direction of the test wave. The 2D sensor surface is perpendicular to the chief ray direction. A typical cladding diameter is 125 µm, making the smallest shearing distance approximately 70 µm. If the imaging system pupil has edge obscuration, then the wedge angle can be reduced because the obscuration provides more room for the tip to fit in.

However, the manufacturing process errors of 2D sensors can deviate a sensor from an ideal 2D uniform pixel grid to a slightly stretched pixel grid and likely make the sensor surface not flat (e.g. due to warping error). The sensor pixels can also have XY and Z random errors. Before these errors are calibrated out, they cause systematic errors in the wavefront measurement by the above non-common path fiber tip diffraction interferometer. Simulations show that an XY stretch of 1/10 of a pixel or surface warping of 3 µm peak-to-valley of a one-inch size sensor already cause a systematic wavefront measurement error on the order of 0.1 nm RMS.

The pixel XY error and surface warping error of a 2D sensor can be calibrated accurately by using a white light interferometer and two ideal spherical wave sources such as two SMF tips. The white light interferometer is used to measure the Z profile of the sensor surface. The whole Z profile can be obtained by stitching multiple measurement maps. The pixel XY error of each pixel can be measured in a typical two spherical wave interference null test, with multiple rotation orientations of the sensor. The Z profile measurement step breaks the correlation between Z and XY error calibration in the above null test.

If the above sensor errors are correctly calibrated, the test wave in FIG. 8 can be temporarily replaced by another same-wedged SMF tip. In this null test, the XYZ locations of both tips can be accurately measured to nm level. This can establish an accurate XYZ coordinate system between the reference wave source and the sensor. Replacing the second fiber tip with the test wave can continue the test wavefront measurement. One of the accuracy limitations is the alignment of the test wave focal point. To reduce the ringing effect in interferograms caused by edge diffraction in the imaging system being measured, a broad bandwidth light source, with short coherent length, can be used.

All these complex sensor calibration procedures can be avoided by using a common path mode fiber tip diffraction interferometer.

Figure 9:
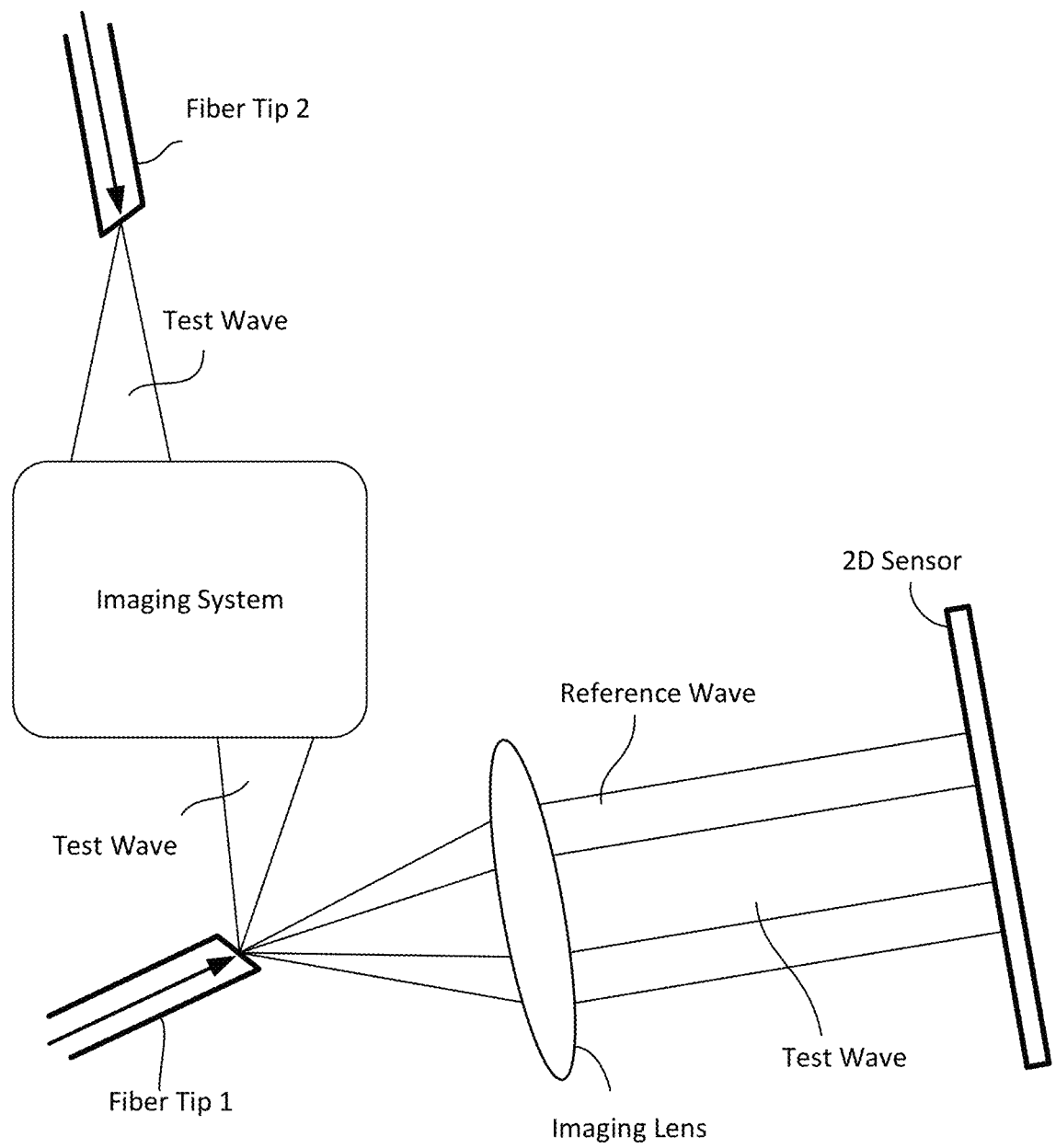
FIG. 9 is a diagram illustrate a common path mode fiber tip diffraction interferometer.

FIG. 9 is a diagram which illustrates a common path mode fiber tip diffraction interferometer. The test wave is coupled into the imaging system to be measured from the upper side in the same way as in FIG. 7. The test wave is focused onto and reflected by the fiber tip. The fiber tip also generates the reference wave. The reflected reference wave and transmitted test wave inside the fiber by the fiber tip end surface are not shown in FIG. 9. The reflected test wave and generated reference wave are in common path mode.

Simulations show that a wedged and uncoated SMF tip generates a near-perfect spherical wave by diffraction. The super-polished, uncoated flat surface of the reference fiber tip is a high-quality reflection mirror (e.g. about 125 µm size). Its power reflectivity is about 4%, depending on polarization, wedge angle, wavelength and fiber material. In FIG. 9, the tip wedge angle can be configured to generate large enough refraction angle of the reference wave such that the test wave and reference wave are fully separated. The test wave is focused onto the surface of the reference tip and is reflected to the direction of the refracted reference wave. The wedge angle of the reference tip is flexible. With alignment of the test wave, such as the shearing and focus adjustment between both waves, both waves are in common path mode after the reflection such that the systematic errors of the pupil imaging optics and the sensor cancel out. This is advantageous when compared with the design of a non-common path mode fiber tip diffraction interferometer. The light intensities of both interference arms are controlled to generate optimum contrast of interferograms.

A phase jump of test wave upon the reflection on the reference tip flat surface is approximately zero with the angle of incidence (AOI) even up to the Brewster's angle, which is approximately 55 degrees. This is because the imaginary part of the refractive index of fiber material (e.g. silica) is small. For both 355 nm and 633 nm wavelengths, this quantity is on the order of 1E-9 and 1E-10, respectively. Because of the oblique reflection on the reference tip flat surface, linear polarization light is used for the measurement. This includes either p- or s-polarization referred to the test wave reflection plane (the plane of the page surface in FIG. 9). Circular polarization state will be changed by the reflectivity difference between p- and s-polarization of this reflection. If the reference SMF tip is coated by a thin metal film, the film will cause a phase difference between the reflected test wave and the transmitted reference wave, generating systematic errors in wavefront measurement.

When the NA of the test and reference waves are close in a common path mode design, the sizes of both waves on the tip surface are close and the wavefront effect of the small non-flatness of the tip surface (e.g., 0.1 nm dip) will cancel out approximately by half between the reflected test and transmitted reference waves. Tip surface roughness (e.g., less than 0.8 nm RMS) has a small effect to the diffraction reference wave sphericity, which is also true for the reflected test wave because they are in common path mode and follow the same diffraction physical law.

The single imaging lens in FIG. 9 stands for a pupil viewing system which images the exit pupil of the measured imaging system to the flat 2D sensor. In order to image the exit pupil, which is a spherical surface, to the 2D sensor without distortion, the pupil viewing system needs to be aplanatic (i.e. the design follows the sine condition). One example of such a system is a transmission sphere in a Fizeau interferometer. In FIG. 9, such a transmission sphere with a concave spherical reference surface can be used with the reference surface concentric with the reference fiber tip. Because the reference wave is generated by the reference SMF tip, the reference surface of the transmission sphere needs AR coating to remove the reflection interference from it. When the reference surface of the transmission sphere is not AR coated, the reflected test and reference waves by this surface are focused back to the reference SMF tip end surface (e.g., fiber tip 1 in FIG. 9) and partially trace back to the tip end surface of fiber tip 2 after passing the measured imaging system for the second time. A wedged fiber tip 2 reflects off this optical feedback in wavefront measurements.

When the wavefront aberration of the measured imaging system is large, the spot size of the focused test wave on the tip end will be also large. A typical 125 µm fiber tip end diameter can be too small. The exit pupil of the imaging system is imaged to the sensor. When the pupil is far away from the fiber tip in FIG. 9, because the fiber end is equivalent to a limiting aperture in the pupil imaging path, its size will limit the pupil resolution on the sensor. This is because the NA of the pupil imaging path is determined by the ratio between the fiber end size and the distance between the exit pupil and the tip.

Figure 10:
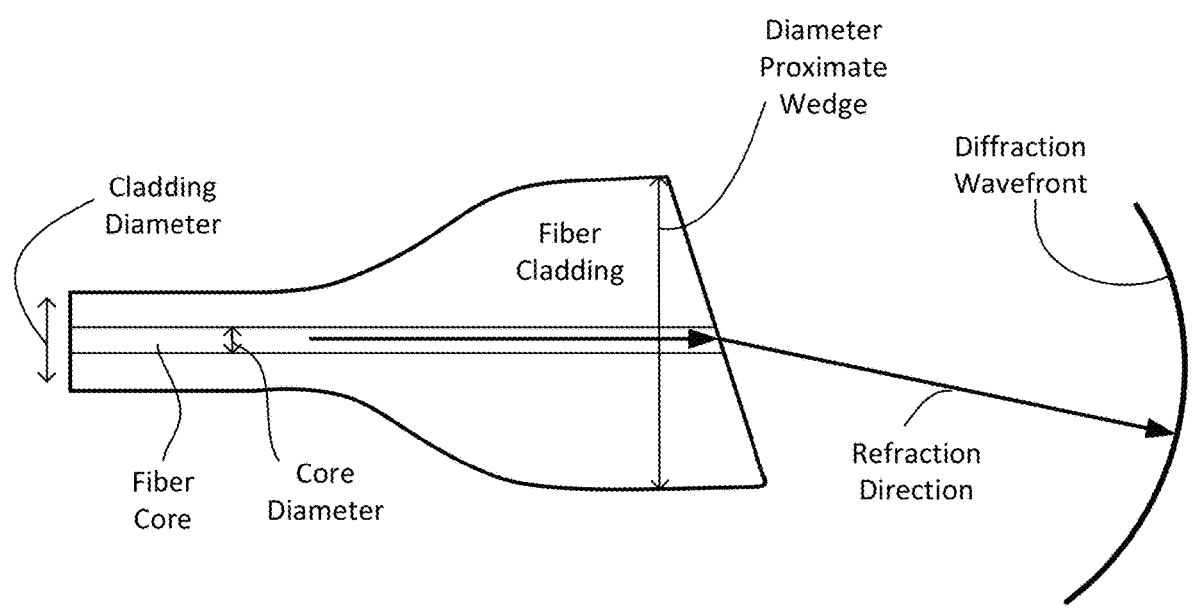
FIG. 10 is a diagram illustrating a wedged SMF tip with end diameter of mm level or larger.
Figure 11:
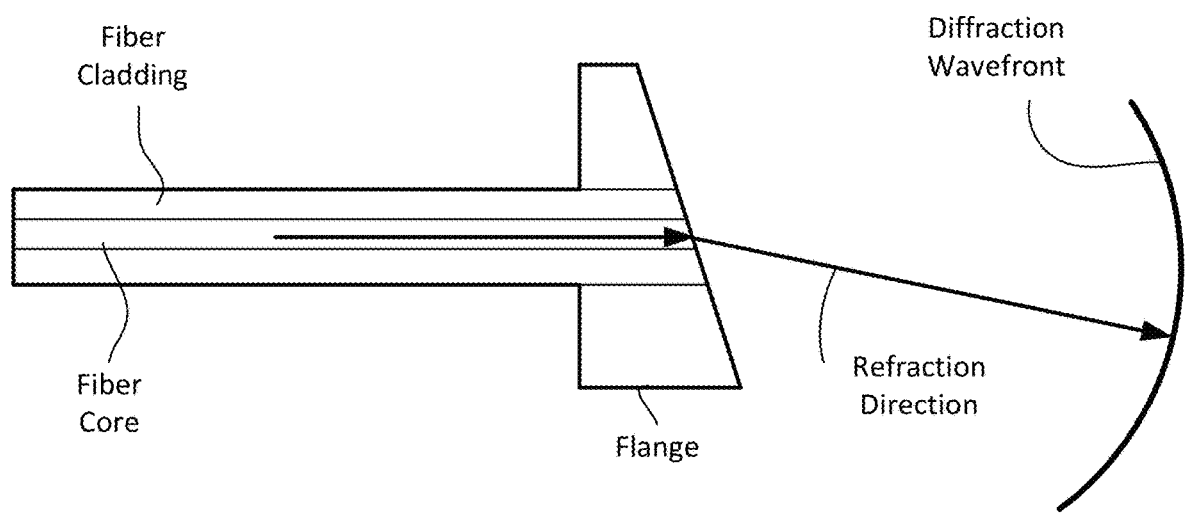
FIG. 11 is a diagram illustrating a wedged SMF tip embedded in a flange with end diameter of mm level or larger.

FIG. 10 illustrates a wedged and uncoated SMF tip with end diameter of mm level or larger. The left side SMF has typical cladding diameter (e.g., 125 microns), but the end side has a larger diameter. Compared with FIG. 1, the reflected light from the end surface inside the fiber is not shown. FIG. 11 illustrates a wedged SMF tip is embedded in a flange. The flange end surface has a diameter of mm level or larger. The left side SMF has typical cladding diameter (e.g., 125 microns). The fiber cladding and the flange are in optical contact and the flange end surface is super-polished at the same wedge angle and is uncoated. The reflected light from the end surface inside the fiber is not shown in FIG. 11.

A wedged and uncoated SMF tip can be used, such as the SMF tip shown in FIG. 10. While the fiber core size is kept the same and the left side cladding diameter is approximately 125 μm, the tip end diameter is approximately 1 mm or even larger. The fiber length of this larger diameter can be approximately 1 cm for easy mounting of the SMF tip. Such a fiber tip will have large enough reflection area.

FIG. 11 is another design of large reflection area. A wedged SMF tip is embedded in a flange. The material of the flange is to be the same as the cladding material as close as possible. Inside the flange, the cladding surface and the flange are in optical contact, such as by an epoxy of matching refractive index with the cladding material. The end surface of the flange is super-polished at the same wedge angle as the SMF tip and is uncoated. The flange end diameter is approximately 1 mm or larger. The cladding diameter is approximately 125 The flange thickness along the fiber axis can be about several mm or 1 cm for easy mounting.

Figure 12:
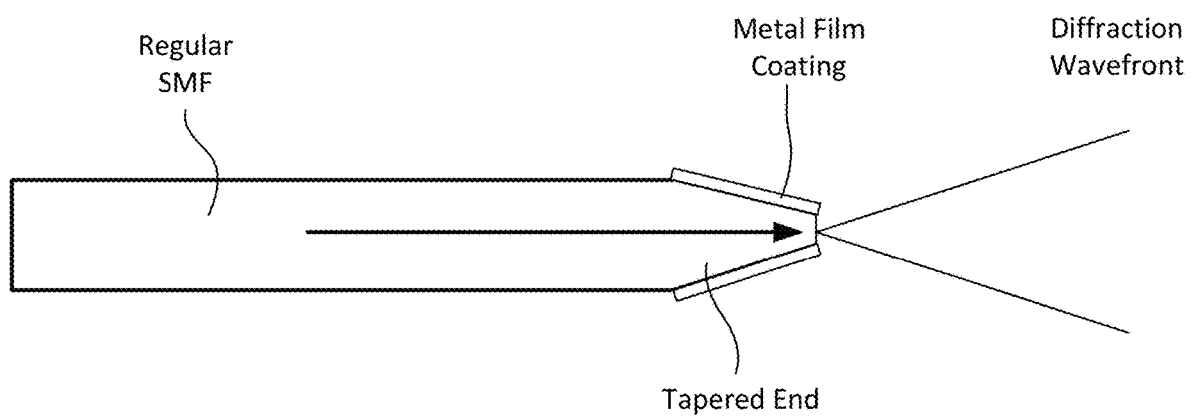
FIG. 12 is a schematic of a tapered fiber tip with a metal side coating.

FIG. 12 is a tapered fiber tip with a metal side coating. The length of the tapered region can be approximately a few millimeters. A diameter of the tapered end can be less than approximately 1 The metal coating can be materials such as aluminum, nickel, or chrome. The metal coating can have a thickness of approximately 100 nm. The tip flat end can be super-polished and can be wedged or not wedged.

The embodiments disclosed in FIGS. 1, 9, 10, and 11 describe common path mode fiber tip diffraction interferometers (FTDI) of wavefront measurement for a refractive or reflective imaging system or a transmissive positive lens. In these embodiments, a single mode fiber (SMF) tip is wedged. Thus, the flat end surface is not perpendicular to the fiber axis. The SMF tip generates a near-perfect spherical reference wave for the interferometer. A near-perfect spherical test wave can be generated by wave diffraction from a second SMF tip or a small size pinhole, or by a tapered fiber tip with a metal side coating as shown in FIG. 12. After the test wave passes through the imaging system or the positive lens being measured, it is focused onto the wedged reference fiber tip end flat surface. On the surface, the test wave is reflected to the direction of the outgoing reference wave. After the reflection, the test and reference wave are in common path mode and generate interferograms on a 2D sensor. To improve the pupil measurement resolution, specially-designed reference fiber tips with millimeter or larger end diameters can be used.

Figure 13:
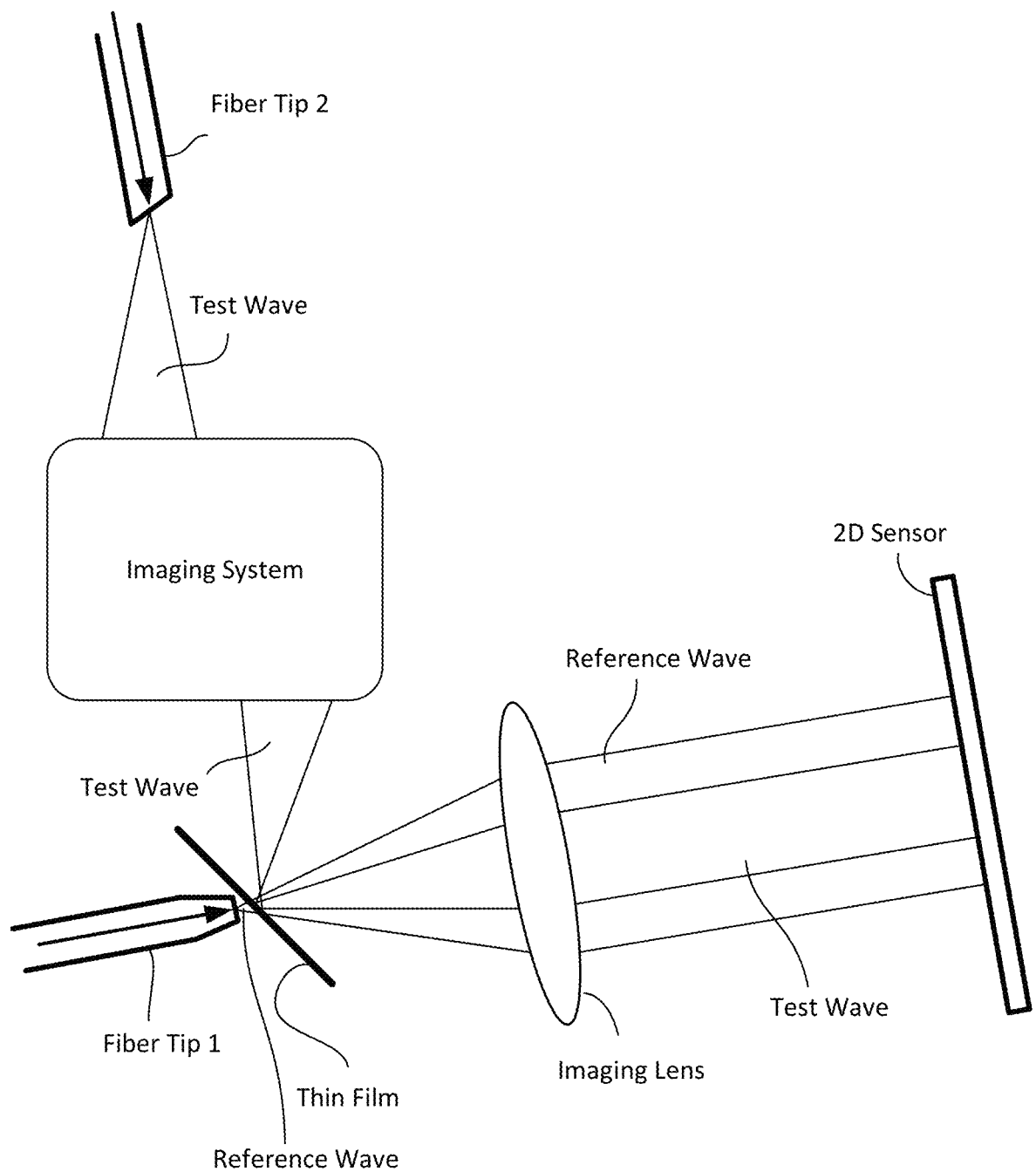
FIG. 13 is a diagram illustrating a common path mode fiber tip diffraction interferometer using a high-quality thin film as a beam combiner.

FIG. 13 illustrates another embodiment of common path mode fiber tip diffraction interferometer. In the embodiment, a reference SMF tip (fiber tip 1) is used to generate a near-perfect spherical reference wave and a second SMF tip (fiber tip 2) or a small size pinhole or a tapered fiber tip with a metal side coating (as shown in FIG. 12) is used to generate a near-perfect test wave. The test wave is coupled into the imaging system being measured from the upper side in the same way as in FIG. 7 or FIG. 9. A high-quality thin film is used as the beam combiner between the reference and test waves. In FIG. 13, the reference wave transmits through the thin film. The film surface facing the focused test wave reflects the test wave to the direction of the reference wave. After the reflection, the reference and test waves are in common path mode. The tilt angle of the thin film is large enough to fully separate the focused test wave and the transmitted reference wave.

The thin film surface reflecting the test wave is uncoated, but the surface facing the reference fiber tip is AR coated. A high-quality AR coating can reduce the reflectivity of the coated surface down to less than 0.0001, suppressing the unnecessary reflections from this surface. To reduce the wavefront effect when the reference wave transmits through the thin film, the thickness of the thin film is reduced down to a few hundred nm. For example, a few hundred nm thick and mm lateral size $Si_3N_4$ single crystal film, $SiO_2$ film, diamond film, or other materials can be made. Because of single crystal structure, its surfaces are perfectly flat. The wavefront effect of the thin film to the reference wave can be accurately modeled by optical design software such as Zemax. For such a thin film and after removing tilt and defocusing terms from the transmitted reference wave, the wavefront distortion by the thin film is negligible compared to the accuracy target of 0.1 nm RMS. The reflected reference wave and transmitted test wave by the uncoated surface of the thin film are not shown in FIG. 13. Such a thin film can be made by standard semiconductor processing procedures. The light intensities and polarization states of both interference arms are controlled to generate optimum contrast of interferograms.

The embodiment in FIG. 13 provides design flexibility of a fiber tip reference wave source. The tapered and metal film side-coated fiber tips (as shown in FIG. 12) can be used. This type of reference tip can generate a near-perfect reference wave of larger NA and can be used to measure imaging systems of larger NA. The distance between the reference tip and the AR coated thin film surface is on the order of mm. As shown in FIG. 13, the focal point of the test wave is not on the thin film surface. The test wave focal point and the reference tip are a pair of conjugate images of the reflection surface of the thin film. In this embodiment of common path mode FTDI, the wavefront measurement accuracy can be limited by the quality of the thin film. The design in FIG. 13 can be used for wavefront metrology applications which do not require the highest accuracy. Like the embodiment in FIG. 9, the image lens stands for an aplanatic pupil viewing system which images the exit pupil of the imaging system being measured to a 2D sensor without distortion. The reference SMF tip is at the location of the front focal point of the pupil viewing system. The front focal point includes the wavefront effect of the thin film.

A second pupil imaging system can be added in the direction of the transmitted test wave (not shown in FIG. 13) either for alignment or wavefront metrology purposes by using the interference between the transmitted test and reflected reference waves. In summary, FIG. 13 illustrates a second embodiment of common path mode FTDI.

The advantage of using a fiber tip diffraction reference wavefront is its near-perfect sphericity. Therefore, one can avoid the complex calibration process of a real reference surface in an interferometer (e.g., a Fizeau interferometer). When pursuing a wavefront measurement accuracy on the order of sub-nm RMS, the quality of this reference wavefront (sphericity) must be measured carefully before using it. Current calibration methods of this reference wavefront are limited by the systematic errors in pupil imaging optics and 2D sensor. As disclosed herein, new calibration methods of the sphericity of fiber tip diffraction wavefronts can be performed by using the proposed common path mode FTDI methods. The disclosed methods remove the calibration accuracy limitation by the systematic errors in pupil imaging optics and 2D sensor.

Figure 14:
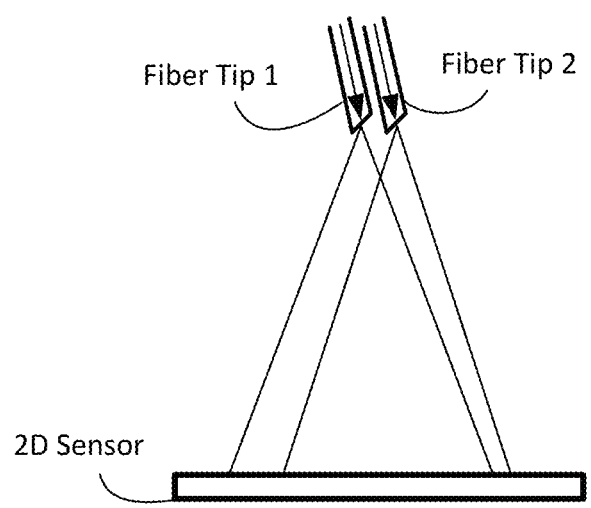
FIG. 14 is a diagram illustrating calibrating fiber tip diffraction wavefront without using an imaging lens or an imaging system.

FIG. 14 shows one calibration method of fiber tip diffraction wavefront in a previous design. Two similar fiber tips are aligned side-by-side and the two waves from them interfere directly on a 2D sensor, which is positioned at a distance from both tips. There are no other optical elements between the tips and the sensor, which can avoid extra errors from the other optical elements. By modeling the measured interferograms by the ideal case of two spherical wave interference, the residual can provide the sphericity of the diffraction waves. The assumption of this calibration method is that the locations of each pixel on the sensor is known in the measurement XYZ coordinate. Sub-micron level accuracy is needed in order to reach a sub-nm level wavefront calibration accuracy. Furthermore, if the sensor pixel XYZ are known accurately, the locations of the two source points can be determined accurately with the model of two spherical wave interference. However, a real 2D sensor can have the pixel location in-plane error such that the pixels do not form an ideally uniform 2D sampling grid. The sensor surface typically is not perfectly flat but has warping error. Calibration of these two errors of a real 2D sensor accurately can be performed.

Figure 15:
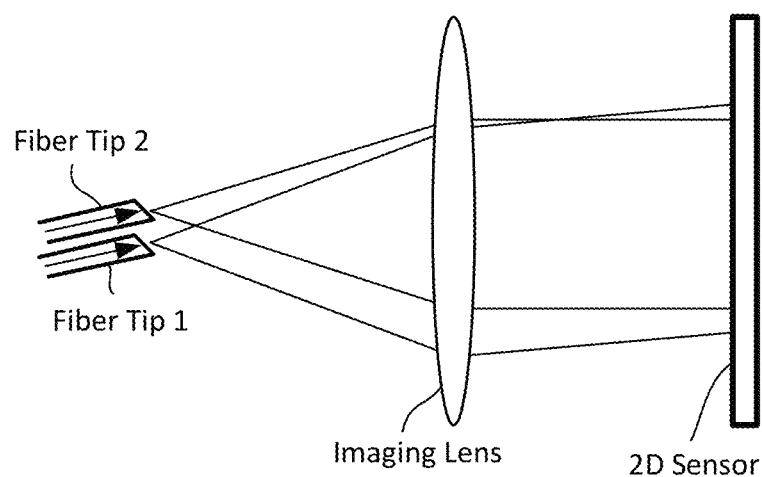
FIG. 15 is a diagram illustrating calibrating fiber tip diffraction wavefront using an imaging lens or an imaging system.

FIG. 15 illustrates calibrating fiber tip diffraction wavefront using an imaging system, represented by the imaging lens. Two wavefronts from two similar fiber tips are aligned side-by-side. The two waves from them interfere on a 2D sensor after they pass the imaging system. The lateral shearing between the two waves cannot be zero, making them travel not exactly in common path mode in the imaging system. Compared with the method in FIG. 14, the two waves travel approximately in common path mode in the imaging system and the errors of the imaging optics and the 2D sensor mostly cancel out. However, this non-zero lateral shearing between the two waves makes the imaging process not completely in common path mode, which introduces the systematic error of imaging optics into the calibration. This systematic error can be corrected by ray tracing modeling of the imaging system based on detailed information about the imaging system.

Figure 16:
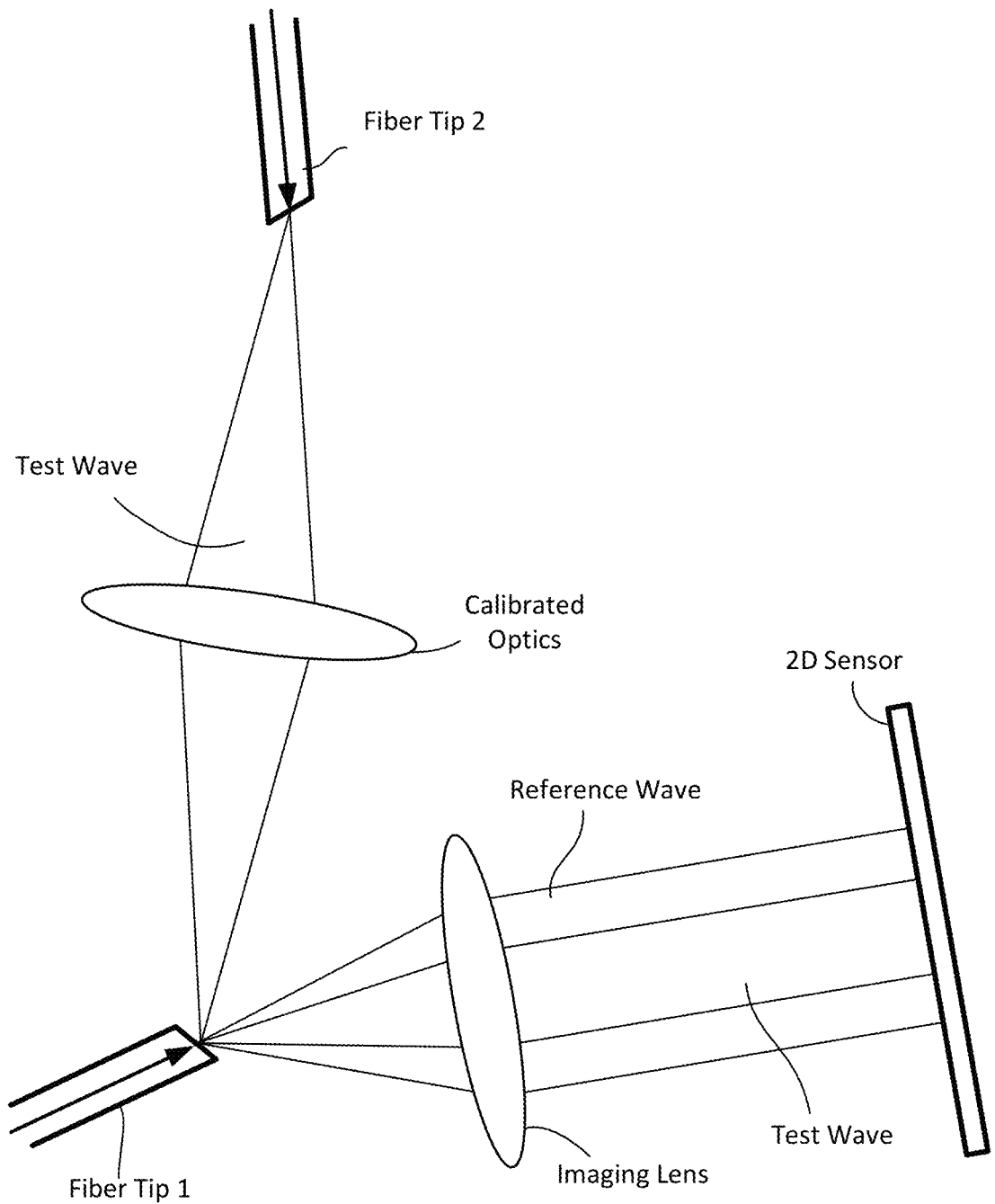
FIG. 16 illustrates calibrating fiber tip diffraction wavefronts by using a common path mode fiber tip diffraction interferometer (FTDI)

The calibration method of FIG. 16 uses the common path mode FTDI as disclosed in FIG. 9. In this interferometer, the wedged fiber end (fiber tip 1) generates the reference wave and its end flat surface also acts as a high-quality mirror. Fiber tip 2 generates the test wave, which first passes a calibrated optics (e.g., a focal lens), and then is focused onto the end surface of fiber tip 1. The focused test wave is reflected to the direction of the reference wave propagation. After the reflection, both waves are in common path mode and the systematic error of the imaging system cancels out. The size of the calibrated optics is large enough to cover the whole NA of the test wave. For pupil resolution improvement, a fiber tip design as in FIG. 10 or FIG. 11 can be used to replace the reference fiber tip 1 in FIG. 16. The fiber tip 1 is at the location of the front focal point of the pupil imaging system.

The calibrated optics piece can be calibrated under the same light wavelength and polarization of fiber tip diffraction. For a single lens, the calibration accuracy of its aberration can reach as high as sub-nm level by methods such as a Fizeau interferometer. The aberration accuracy of the calibrated optics used here determines the accuracy of the proposed fiber tip diffraction wavefront calibration. In the calibration process, a rotationally symmetric calibrated optic piece about its axis can be rotated multiple times in the range of 360 degrees to average out its aberration, which can further increase the calibration accuracy.

In FIG. 16, fiber tip 2 can be rotated by 180 degrees around the optical axis of the test wave. Other rotation orientations are not recommended when linear polarization light (e.g., s-polarization) is used because the rotation will destroy the polarization matching condition between the test and reference waves. Fiber tip 2 can be a tapered fiber tip with thin metal side-coating and sub-micron aperture, such as that illustrated in FIG. 12. By calibrating multiple SMF fiber tip pairs, those with the best wavefront quality can be selected.

Figure 17:
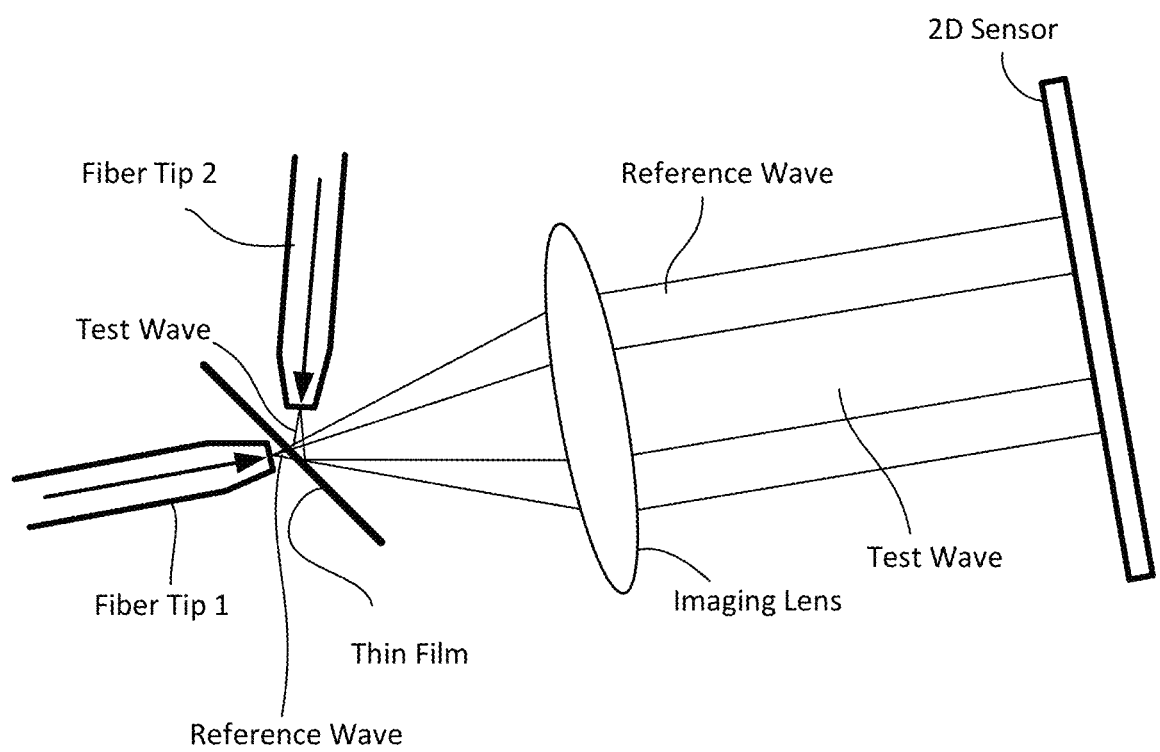
FIG. 17 illustrates calibrating fiber tip diffraction wavefronts by using the thin film based common path mode FTDI.

FIG. 17 illustrates a second calibration method of fiber tip diffraction wavefronts by using the thin film based common path mode FTDI as disclosed in FIG. 13. In this method, no calibrated optics piece is needed. As in FIG. 13, a high-quality thin film is used as the beam combiner of the two diffraction waves from fiber tip 1 and 2. The thin film surface facing the fiber tip 1 is AR coated, which can reduce the reflectivity down to less than 0.0001. The thin film surface facing fiber tip 2 is uncoated and reflects the wave from tip 2 to the direction of tip 1 wave. After the reflection, both waves travel in common path mode. As discussed before, the thin film thickness is a few hundred nm. The reflection surface flatness quality is high when single crystal thin film such as $Si_3N_4$, $SiO_2$, diamond film, or other materials is used. The wavefront effect when the wave of fiber tip 1 transmits through the thin film can be accurately modeled by software tool such as Zemax, and after removing tilt and defocus terms, the wavefront distortion of the reference wave is negligible. Compared with the first calibration method, although this method does not use a calibrated optics piece, it requires a high-quality thin film. The distance of both tips to thin film is on the order of mm. Both tips are conjugate with each other to the thin film mirror. The tilt angle of the thin film is large enough to fully separate the input fiber tip 2 wave and the reflected fiber tip 2 wave. Fiber tip 1 is at the front focal point of the imaging system. The front focal point includes the wavefront effect of the thin film.

Figure 18:
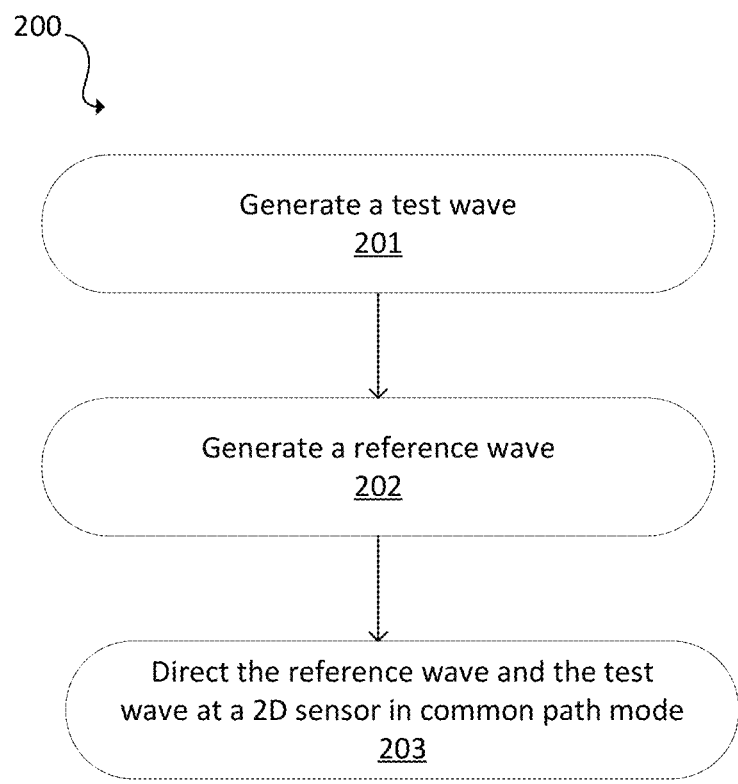
FIG. 18 illustrates a flowchart of an embodiment of a method in accordance with the present disclosure.

FIG. 18 illustrates a flowchart of an embodiment of a method 200. A test wave is generated at 201 and a reference wave is generated at 202. The reference wave is generated with a fiber that includes a single mode fiber tip that defines a wedge at an end. A flat surface of the wedge is not perpendicular to an axis of the fiber. The flat surface of the wedge does not have a coating thereon. At 203, the reference wave and the test wave are directed at a 2D sensor. The test wave and the reference wave can be in a common path mode, which are fully separated before they combine together.

In an instance, the test wave is directed at the flat surface of the reference fiber. The method 200 further includes reflecting the test wave in a direction of the reference wave. The test wave and the reference wave are in a common path mode.

In another instance, the method 200 includes directing the test wave and the reference wave through an aplanatic imaging lens or a pupil imaging system.

The test wave may be generated using a second of the reference fiber, a small size pinhole diffraction, or a tapered SMF tip with metal film side coating. The test wave and the reference wave are in a common path mode.

The test wave can be directed at a thin film and the reference wave can be directed through the thin film. One surface of the thin film includes an AR coating. The test wave and the reference wave are in a common path mode downstream of the thin film. In this case, the reference wave can be generated by a tapered SMF tip with metal film side coating.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A fiber tip diffraction interferometer comprising:
a first fiber that generates a reference wave, wherein the first fiber includes a single mode fiber tip that defines a wedge at an end, wherein a flat surface of the wedge is not perpendicular to an axis of the fiber, and wherein the flat surface of the wedge does not have a coating thereon;
a second fiber or a pinhole that generates a test wave, wherein the test wave is focused to a point where the test wave is reflected, wherein the test wave and the reference wave are in a common path mode after the test wave is reflected, and wherein the reference wave is projected outward from the flat surface and the test wave is reflected from the flat surface;
an aplanatic imaging lens or a pupil imaging system disposed to receive both the test wave and the reference wave; and
a sensor configured to receive both the test wave and the reference wave, wherein the sensor is disposed on an opposite side of the aplanatic imaging lens or a pupil imaging system from the first fiber.

2. The fiber tip diffraction interferometer of claim 1, wherein the flat surface is disposed at an angle from 14 degrees and 25 degrees relative to the axis of the fiber.

3. The fiber tip diffraction interferometer of claim 1, wherein the fiber has a diameter of 125 µm.

4. The fiber tip diffraction interferometer of claim 1, wherein the surface roughness of the flat surface is from 0 nm RMS to 0.8 nm RMS.

5. The fiber tip diffraction interferometer of claim 4, wherein a surface roughness of the flat surface is 0.4 nm RMS or less.

6. The fiber tip diffraction interferometer of claim 1, wherein the fiber defines an outer circumferential surface, and wherein at least part of the outer circumferential surface does not have a coating thereon.

7. The fiber tip diffraction interferometer of claim 1, wherein the fiber defines a first diameter at a point adjacent where the wedge is disposed and a second diameter at a non-zero point away from the first diameter, wherein the first diameter and the second diameter are the same.

8. The fiber tip diffraction interferometer of claim 1, wherein the fiber defines a first diameter at a point adjacent where the wedge is disposed and a second diameter at a non-zero point away from the first diameter, wherein the first diameter is larger than the second diameter.

9. The fiber tip diffraction interferometer of claim 8, wherein the first diameter is at least 1 mm and the second diameter is 125 µm.

10. The fiber tip diffraction interferometer of claim 1, wherein the first fiber and/or the second fiber is silica, and wherein a core of the first fiber and/or the second fiber is doped.

11. The fiber tip diffraction interferometer of claim 1, further comprising an imaging system, wherein the test wave passes from the second fiber through the imaging system.

12. The fiber tip diffraction interferometer of claim 1, further comprising a calibrated optics in a path of the test wave configured to calibrate a sphericity of the test wave and the reference wave.

13. The fiber tip diffraction interferometer of claim 1, further comprising a laser in optical communication with the first fiber and the second fiber.

14. The fiber tip diffraction interferometer of claim 13, further comprising:
a splitter in optical communication with the laser, wherein the splitter forms a first laser path to the second fiber or the pinhole and a second laser path to the first fiber;
a first polarization control unit along the first laser path;
a second polarization control unit along the second laser path;
a power control unit along the second laser path;
a time delay control unit along the second laser path; and
a phase-shift control unit along the second laser path.

15. A method comprising:
generating a reference wave with a first fiber, wherein the first fiber includes a single mode fiber tip that defines a wedge at an end, wherein a flat surface of the wedge is not perpendicular to an axis of the fiber, wherein the flat surface of the wedge does not have a coating thereon, and wherein the reference wave is projected outward from the flat surface;
generating a test wave with a second fiber or a pinhole, wherein the test wave is directed at the flat surface of the first fiber;
reflecting the test wave from the flat surface to be in a direction of the reference wave, wherein the test wave and the reference wave are in a common path mode after the reflecting; and
directing the reference wave and the test wave at a 2D sensor after the reflecting.

16. The method of claim 15, further comprising directing the test wave and the reference wave through an aplanatic imaging lens or system.

17. The method of claim 15, further comprising calibrating a diffraction wavefront of the test wave using a calibrated optics.

* * * * *